United States Patent [19]
Walker

[11] Patent Number: 5,173,775
[45] Date of Patent: Dec. 22, 1992

[54] REFORMATTING OF TELEVISION SIGNAL DATA FOR TRANSMISSION USING A DIFFERENT MODULATION SCHEME

[75] Inventor: G. Kent Walker, Escondido, Calif.

[73] Assignee: General Instrument Corporation, Hatboro, Pa.

[21] Appl. No.: 694,793

[22] Filed: May 2, 1991

[51] Int. Cl.[5] ........................ H04N 7/08; H04N 7/087; H04N 7/10; H04N 9/34
[52] U.S. Cl. .................................... 358/141; 358/142; 358/147
[58] Field of Search ................. 358/141, 167, 86, 174, 358/12, 142, 147; 380/10, 11, 15, 20, 21; 455/3, 6; 360/18, 24

[56] References Cited

U.S. PATENT DOCUMENTS

| | | | |
|---|---|---|---|
| 4,523,228 | 6/1985 | Banker | 380/20 |
| 4,533,936 | 9/1985 | Tiemann et al. | 358/12 |
| 4,571,615 | 2/1986 | Robbins et al. | 380/20 |
| 4,688,246 | 8/1987 | Eilers et al. | 358/86 |
| 4,706,109 | 11/1989 | Murray | 358/12 |
| 4,839,922 | 6/1989 | Imasaki | 380/20 |
| 4,901,351 | 2/1990 | Tanaka et al. | 380/20 |
| 4,959,862 | 9/1990 | Davidov et al. | 358/86 |
| 5,073,930 | 12/1991 | Green et al. | 358/86 |

FOREIGN PATENT DOCUMENTS

2135552  9/1984  United Kingdom .

Primary Examiner—James J. Groody
Assistant Examiner—Glenton B. Burgess
Attorney, Agent, or Firm—Barry R. Lipsitz

[57] ABSTRACT

Television distribution apparatus includes a satellite television receiving station for receiving and demodulating a television signal transmitted as a frequency modulated signal from a satellite. Timing information is recovered from the demodulated television signal. The amplitude of data portions of the demodulated television signal is adjusted in response to the timing information to a level suitable for transmission using amplitude modulation. The original amplitude of television information portions of the signal is maintained. The demodulated television signal with the adjusted data portions is amplitude modulated for distribution to a plurality of subscriber locations.

17 Claims, 4 Drawing Sheets

REFORMATTING OF TELEVISION SIGNAL DATA FOR TRANSMISSION USING A DIFFERENT MODULATION SCHEME

BACKGROUND OF THE INVENTION

The present invention relates to the communication of television signals having a television information portion and a digital data portion, and more particularly to a method and apparatus for converting such signals formatted for transmission using a first modulation scheme to a format suitable for transmission using a different modulation scheme.

Television signals are frequently transmitted together with digital data in satellite television and cable television ("CATV") distribution systems. For example, digital audio information can be provided in nonvideo portions of a video waveform in lieu of the analog video components of a standard television signal. Two such systems are disclosed in U.S. Pat. No. 4,563,702 entitled "Video Signal Scrambling and Descrambling Systems" to Heller, et al and U.S. Pat. No. 4,613,901 entitled "Signal Encryption and Distribution System for Controlling Scrambling and Selective Remote Descrambling of Television Signals" to Gilhousen, et al. These systems provide for digital stereo audio transmission in the horizontal blanking interval of a National Television System Committee ("NTSC") television signal.

The Gilhousen, et al patent referred to above also discloses the transmission of digital data within a television signal for access control purposes. In particular, a transmitted television signal includes scrambled analog video information, and various control data in a "control channel" portion of the television signal for use in providing signal access only to authorized subscribers.

Most cable television systems receive programming signals via satellite for distribution over the cable network. In order to receive and distribute the satellite signals, the cable operator must have a satellite receiving station located at the headend of the distribution system. Similarly, private cable systems, such as those serving an apartment building, hotel or institution as a closed user group, may receive programming from satellites, in which case the system is referred to as a satellite master antenna television system ("SMATV"). Both cable television and SMATV systems usually distribute television signals using amplitude modulation ("AM"). The transmission of television signals to the CATV or SMATV headend by satellite, in contrast, uses frequency modulation ("FM"). FM modulation is used on the satellite link for its greater resistance to noise and distortion.

Unfortunately, the requirements for transmitting digital data using FM techniques are not always compatible with the requirements for transmitting the same data using AM techniques. The audio and control channel data included in television signals transmitted via satellite is typically pulse amplitude modulated ("PAM") multilevel (e.g., two level) data. The optimum PAM amplitude for two-level data differs widely between FM and AM transmission. Therefore, the CATV or SMATV distribution of a television signal received from a satellite is not a simple matter of demodulating the received FM signal to baseband, and then AM modulating the signal for distribution via cable. Modifying the signal at the satellite transmitter for subsequent AM distribution is not practical, since the satellite signal may also be provided to direct broadcast satellite ("DBS") subscribers, who receive television programming directly from a satellite using a small and low cost earth station they own and operate. In DBS applications, there is no AM retransmission of the television signal, and the data format must therefore be optimized for the FM satellite transmission.

It would be advantageous to provide a method and apparatus for translating television signals formatted for transmission using a first modulation scheme (e.g., satellite FM) to a format suitable for transmission using a different modulation scheme (e.g., CATV or SMATV AM). In particular, it would be advantageous to provide a format translator that adjusts the amplitude of data portions of a received satellite television signal to an acceptable level for communication using an AM modulation scheme. It would be further advantageous to provide such a format translator that is relatively simple in design and construction, reliable, and low cost.

The present invention provides a format translator having the above-mentioned advantages.

SUMMARY OF THE INVENTION

In accordance with the present invention, a method is provided for formatting television signals to communicate data contained therein using a particular modulation scheme. A television signal transmitted using a first modulation scheme is received. The amplitude of data portions of the received signal is adjusted to an acceptable level for communication as part of the television signal using a second modulation scheme. The adjusting step can comprise the steps of detecting a timing reference in the received television signal and adjusting the gain of selected portions (e.g., data portions) of the television signal in response to said timing reference. In the embodiments illustrated herein, the gain is adjusted to vary the amplitude of data portions of the television signal without affecting the amplitude of television information portions thereof.

Apparatus for converting a television signal formatted for transmission using a first modulation scheme to a format suitable for transmission using a different modulation scheme comprises means, coupled to receive a television signal to be reformatted, for detecting timing information indicative of the location of digital data contained in the television signal. Means responsive to the timing information reformat the digital data located in the television signal. In an illustrated embodiment, the reformatting means modify the amplitude of the digital data.

In a first illustrated embodiment, the reformatting means comprise a variable gain element (such as an amplifier or attenuator) coupled to receive the television signal. The variable gain element includes a control input responsive to a timing signal derived from the timing information, for changing the element gain during a portion of the television signal containing the digital data. One of the modulation schemes for which the television signal is formatted can comprise frequency modulation, and the other modulation scheme can comprise amplitude modulation. The digital data can be provided as multilevel modulated data, such as two-level or four-level pulse amplitude modulated data.

In a second illustrated embodiment, the reformatting means comprise a first signal path for passing the television signal without a meaningful gain shift, and a second signal path for passing the television signal with a gain shift for modifying the amplitude of the digital data. Switch means are coupled to the first and second paths. Means responsive to the timing information are provided for actuating the switch means to output the television signal from the first path during television information portions thereof and to output the television signal from the second path during digital data portions thereof. Again, the different modulation schemes for which the conversion is made can comprise frequency modulation and amplitude modulation. Also, the digital data can comprise multilevel modulated data, such as multilevel pulse amplitude modulated data.

Television distribution apparatus is provided comprising a satellite television receiving station for receiving and demodulating a television signal transmitted as a frequency modulated signal from a satellite. Means are coupled to the receiving station for recovering timing information from the demodulated television signal. Means responsive to the timing information adjust the amplitude of data portions of the demodulated television signal to a level suitable for transmission using amplitude modulation. The demodulated television signal is amplitude modulated with the adjusted data portions for distribution to a plurality of subscriber locations. The adjusting means can comprise, for example, a variable gain element coupled to receive the demodulated television signal. A control input on the variable gain element is responsive to a timing signal derived from the timing information for changing the element gain during portions of the television signal containing digital data.

In another embodiment of the television distribution apparatus, the adjusting means comprise a first signal path for passing the demodulated television signal without a meaningful gain shift, and a second signal path for passing the demodulated television signal with a gain shift necessary to provide the data signal level suitable for transmission using amplitude modulation. Switch means coupled to the first and second paths are switched in response to the timing information for outputting the demodulated television signal from the first path during television information portions thereof, and to output the demodulated television signal from a second path during digital data portions thereof. The digital data can comprise multilevel modulated data, such as pulse amplitude modulated data.

DETAILED DESCRIPTION OF THE INVENTION

Figure 1:
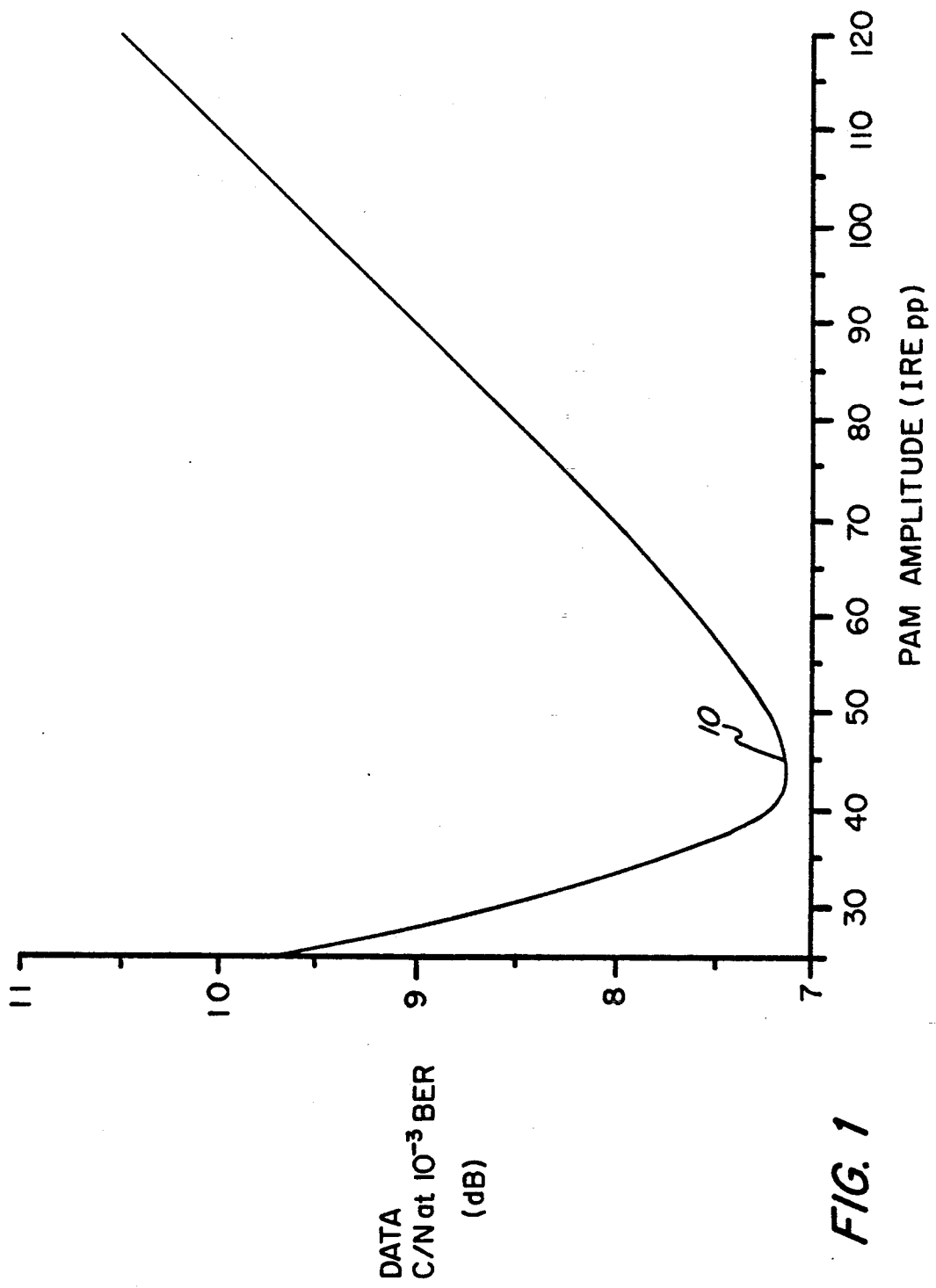
FIG. 1 is a graph illustrating an example of data carrier-to-noise ratio at a specified bit error rate as a function of the PAM amplitude of satellite transmitted data.
Figure 2:
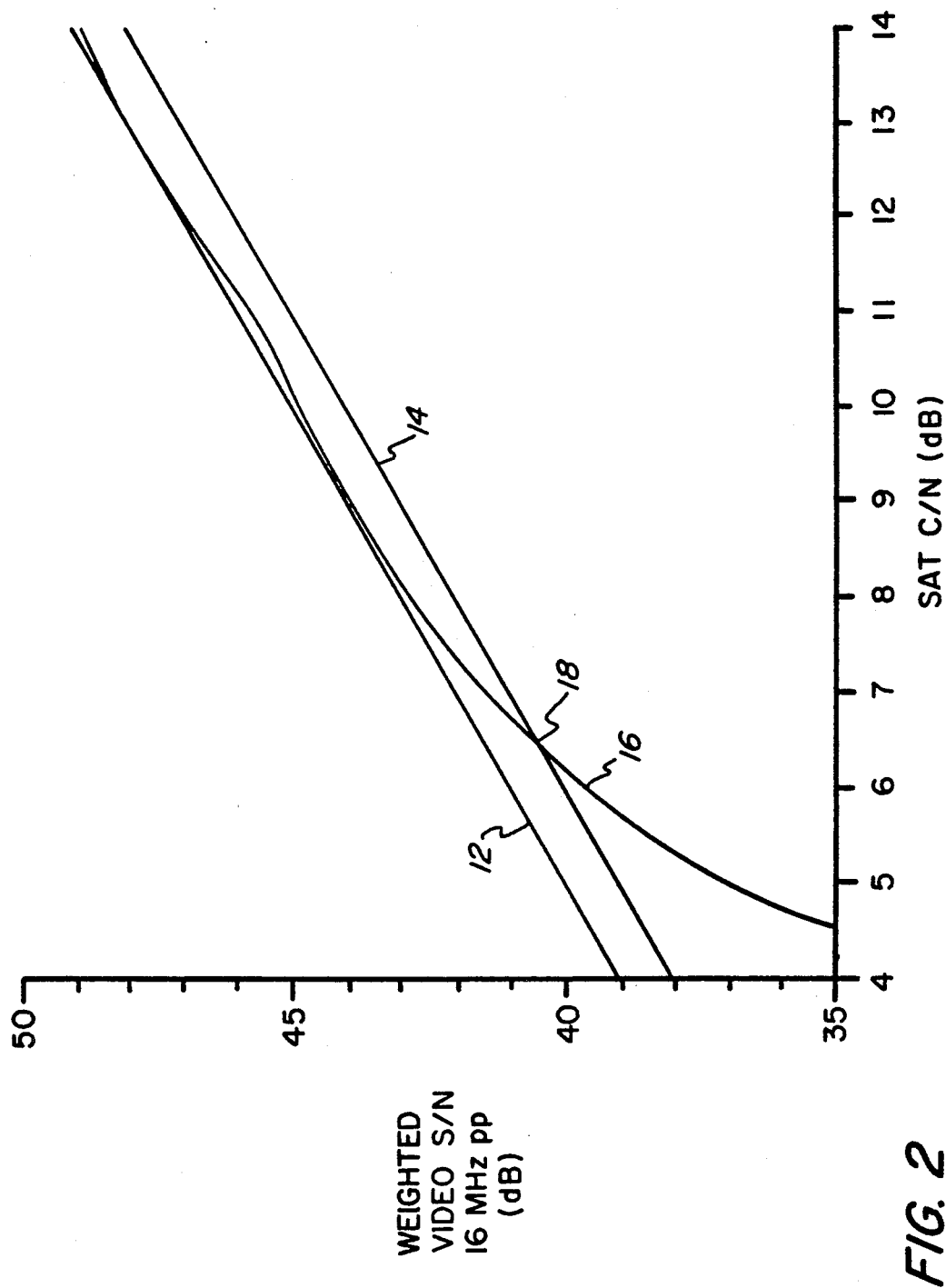
FIG. 2 is a graph illustrating an example of the one dB departure point for a video signal transmitted by satellite using the same modulation parameters for the data transmission illustrated in FIG. 1.
Figure 3:
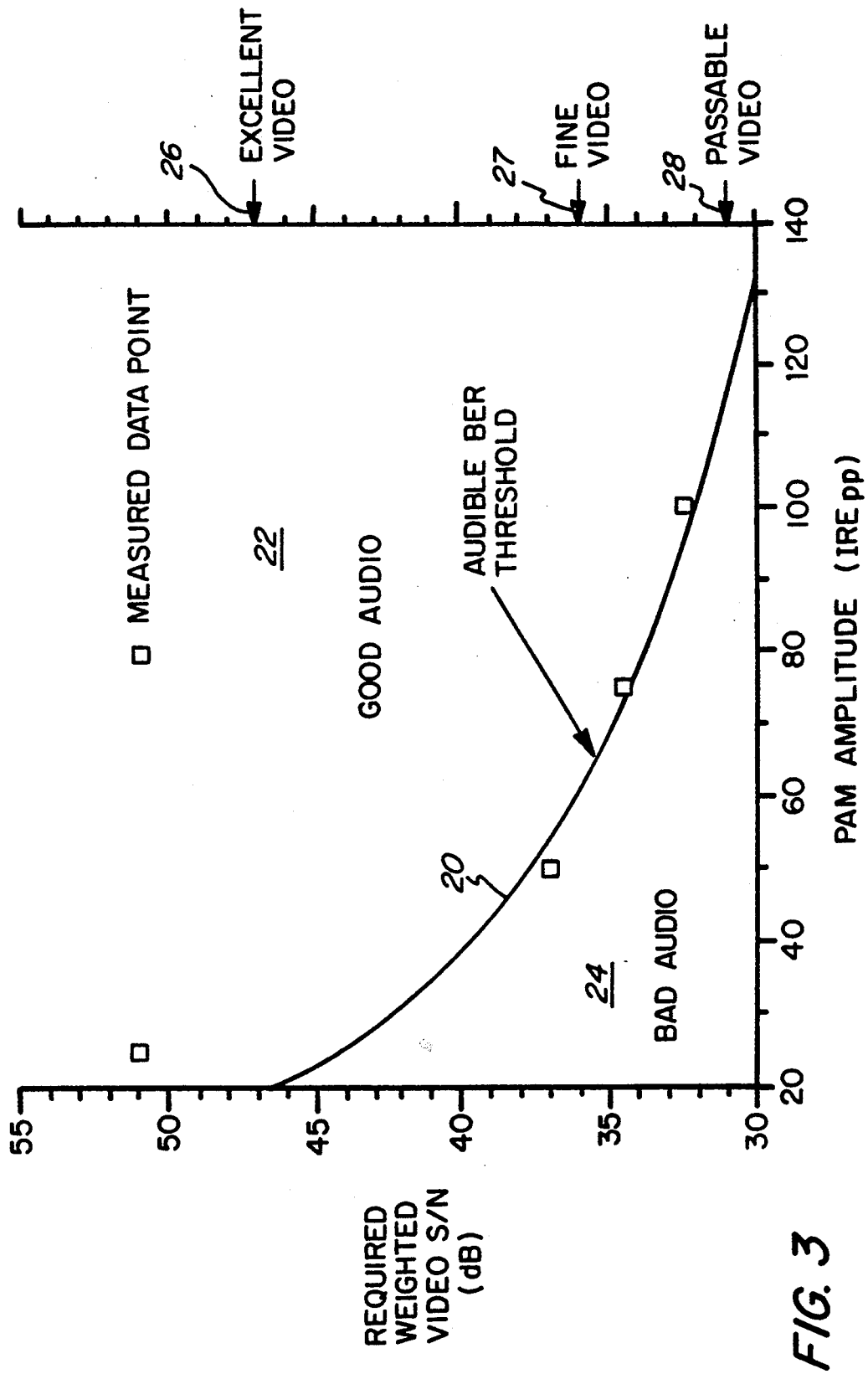
FIG. 3 is a graph illustrating audio and video performance as a function of the video signal-to-noise ratio and data PAM amplitude for a television signal transmitted using AM modulation.

It has been found that the optimum PAM amplitude for two-level data differs widely between FM and AM transmission. This phenomena is illustrated in FIGS. 1–3. The optimum amplitude of pulse amplitude modulated data, for two-level transmission on an FM channel such as that used for satellite television transmission, can be observed from FIG. 1. In this figure, the carrier-to-noise ratio ("C/N") at a bit error rate ("BER") of $10^{-3}$ is plotted against the PAM amplitude of the transmitted data measured in peak-to-peak IRE (Institute of Radio Engineers) units. In satellite transmission, it is advantageous to operate at the lowest C/N ratio possible for satisfactory signal recovery, in order to minimize the required size of the satellite dish antenna. In the example illustrated in FIG. 1, where two-level PAM data is transmitted with a 16 MHz deviation and noise bandwidth of 27 MHz, it can be seen that the optimum PAM amplitude 10 is between 40 and 50 IRE, enabling a C/N ratio of $10^{-3}$ BER of about 7 dB.

FIG. 2 illustrates the received video signal-to-noise ratio ("S/N") versus the satellite carrier-to-noise ratio. As in FIG. 1, the satellite noise bandwidth is 27 MHz. Lines 12 and 14 define the 1 dB departure point for the FM video signal 16. Below the 1 dB departure 18, the video signal will begin to fail, resulting in the breakup of a received television picture. As can be seen, acceptable reception of the video signal will occur for satellite C/N ratios of above about 7 dB. This correlates nicely with the approximately 7 dB data C/N ratio which occurs at the optimum PAM amplitude 10 illustrated in FIG. 1. Therefore, for FM satellite transmission of a television signal, a PAM amplitude for the digital data (e.g., audio data) of 40–50 IRE is preferred.

As illustrated in FIG. 3, a different PAM amplitude is required to enable audio data distribution using AM modulation. Accordingly, an FM modulated television signal received via satellite cannot be simply demodulated and rebroadcast via a CATV or SMATV system using AM modulation. Some accommodation must be made for different PAM amplitude levels required for the digital data. In particular, the PAM amplitude of the digital data must be increased for AM distribution.

In FIG. 3, the required weighted video S/N ratio is plotted against the data PAM amplitude. Unacceptable audible errors occur in the region 24 below curve 20. Acceptable audio results in region 22 above curve 20. In order to provide an acceptable distribution system, the audio and video signals must both be acceptable over the same general range of transmission parameters. Specifications for acceptable video quality are well known in the art. For example, testing has shown that 70 percent of viewers will rate video "excellent" where the video S/N ratio is at least 47 dB. This is indicated at 26 in FIG. 3. Similarly, 70 percent of viewers will rate the video performance "fine" at a video S/N ratio of about 36 dB, as illustrated at 27 in FIG. 3. At a video S/N ratio of 31 dB, 70 percent of viewers will rate the video performance as only "passable", as illustrated at 28 in FIG. 3.

In order for the audio performance to track the video performance over the AM link which is the subject of FIG. 3, a PAM amplitude of approximately 120 IRE is required for the audio data. In other words, for an IRE of 120, the audio data will be rated "good" and the video "passable" when the video S/N ratio is above about 31 dB. On the other hand, the audio and video will both be considered "bad" below the 31 dB video S/N ratio when the audio data PAM amplitude is about 120 IRE. It is therefore clear in the example illustrated in FIGS. 1-3, that although a data PAM amplitude of about 40-50 IRE is optimal for satellite FM transmission, the data PAM amplitude must be increased to about 120 IRE for AM signal distribution.

The present invention provides a method and apparatus for converting a television signal formatted for FM satellite transmission to a format suitable for AM distribution. In the illustrated embodiments, the gain of the television signal is adjusted to vary the amplitude of data portions thereof without affecting the amplitude of television information portions thereof. It should be appreciated that other format conversions can be made instead of a gain shift. For example, a received signal having PAM modulated data can be reformatted in accordance with the present invention by converting the PAM data to another modulation scheme, such as QAM or QPSK. Similarly, an RF video carrier could be reformatted in accordance with the present invention by converting data into a biphase signal, such as suppressed carrier AM VSB filtered BPSK data. Television information portions of the RF video carrier would not be changed.

Figure 4:
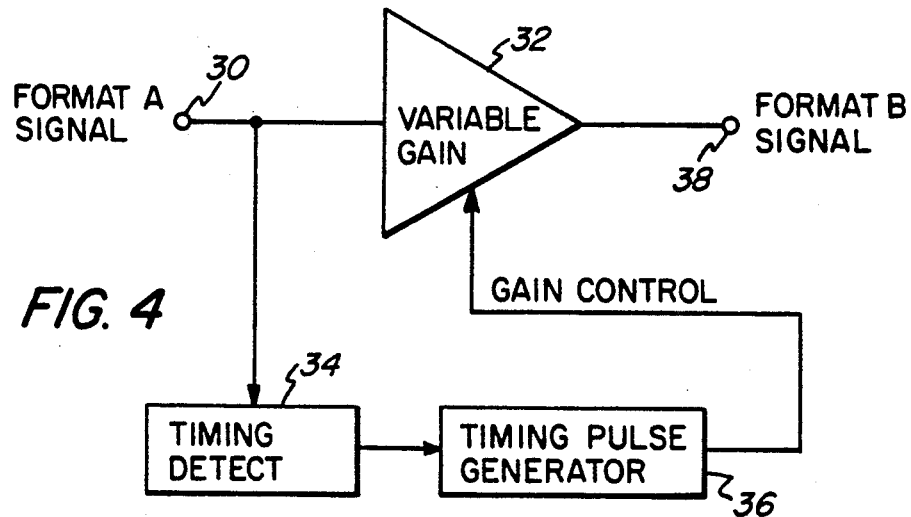
FIG. 4 is a block diagram illustrating one embodiment of a signal reformatter in accordance with the present invention.

A first embodiment of apparatus in accordance with the present invention is illustrated in the block diagram of FIG. 4. In this embodiment, a signal in a first format ("Format A") is coupled to an input terminal 30 of a variable gain element (e.g., amplifier) 32. The signal can be, for example, an FM television signal received from a satellite. The television signal will have both television information and digital data components. Also included in the signal are various components that can be used to derive timing information, such as a horizontal synchronization pulse included in a horizontal blanking interval as well known in the art.

A timing detect circuit 34 detects the timing information, such as the horizontal sync pulse, and inputs the timing information to a timing pulse generator 36. This circuit uses the detected timing information to determine the location(s) of digital data contained in the television signal input to terminal 30. Timing pulse generator 36 can comprise, for example, a counter that responds to the leading edge of a detected horizontal synchronization pulse for counting a predetermined time period after the occurrence of the sync pulse to a data portion of a television line interval. At this point, the timing pulse generator outputs a pulse that is coupled to a gain control input of variable gain amplifier 32 for amplifying or attenuating the gain of the amplifier, as required, during the data period. When the timing pulse output from timing pulse generator 36 is terminated at the end of the data period, the variable gain element returns to its previous gain level for the remaining non-data portions of the television signal. As a result, a signal output at terminal 38 will have a new format ("Format B") in which the television information portions thereof are formatted the same as in the Format A signal, but with the data portions thereof either amplified or attenuated. The amplification or attenuation factor applied by the variable gain element 32 is designed to provide the amplitude of the data portions of the Format B signal at a level suitable for transmission using a desired modulation scheme, such as AM.

Figure 5:
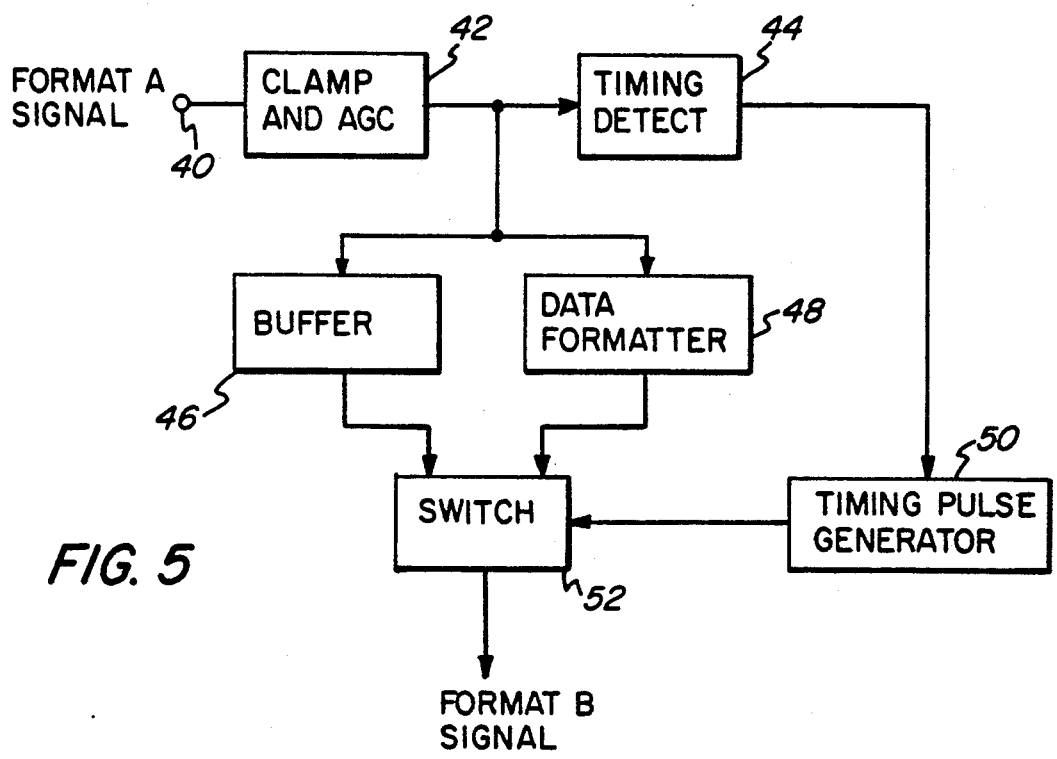
FIG. 5 is a block diagram of another embodiment of a signal reformatter in accordance with the present invention.

FIG. 5 illustrates another circuit for reformatting digital data contained in a received signal without affecting the non-data portions of the received signal. The "Format A" signal to be converted is input to terminal 40 of a conventional video clamp and automatic gain control ("AGC") circuit 42. Both the television video information and digital data contained in the Format A signal are output from circuit 42 for input to a timing detect circuit 44, a buffer 46, and a data formatter 48. Timing detect circuit 44 is identical to the timing detect circuit discussed above in connection with FIG. 4. This circuit detects timing information contained in the Format A signal, and passes the timing information to a timing pulse generator 50 that generates a pulse during the data portions of the Format A signal in the same manner that timing pulse generator 36 of FIG. 4 operates.

Buffer 48 provides a first signal path for passing the Format A signal intact, and without any reformatting, but delayed by a time period that is equal to the inherent delay of data formatter circuitry 48. The data formatter reformats the Format A signal in a desired manner. For example, data formatter 48 can comprise an amplifier or attenuator for providing a gain shift necessary to modify the amplitude of the Format A signal. Alternatively, data formatter 48 can comprise a format translator that changes the nature of data input thereto. As an example, data formatter 48 can comprise a conventional circuit for converting data from a PAM format to a QAM or QPSK format.

The outputs of buffer 46 and data formatter 48 are input to a switch 52 controlled by timing pulse generator 50. Switch 52 will output either the delayed Format A signal from buffer 46, or the reformatted signal from data formatter 48. Thus, for example, where it is desired to adjust the amplitude of data portions of an input television signal without affecting the amplitude of television information portions thereof, timing pulse generator 50 will actuate switch 52 to output the original input signal from buffer 46 during all television information portions, and to output all data portions of the input signal from data formatter 48. The resultant Format B signal will comprise the original signal input to terminal 40 with all data portions thereof reformatted as required. Thus, an FM satellite television signal input to terminal 40 will be output from switch 52 with all PAM data portions thereof at a higher amplitude for redistribution via an AM cable system or the like.

It is noted that the circuitry of FIGS. 4 and 5 can be implemented using either analog or digital techniques. A digital reformatter can provide a better overall system bit error rate performance, since some of the satellite link errors can be corrected. However, a digital solution is considerably more complex and expensive than an analog approach.

It should now be appreciated that the present invention provides format translation for signals, such as television signals, distributed using different modulation schemes. Although the invention has been described in connection with several preferred embodiments, those skilled in the art will appreciate that numerous adaptations and modifications may be made thereto without departing from the spirit and scope of the invention, as set forth in the following claims.

What is claimed is:

1. A method for formatting television signals to communicate data contained therein using a particular modulation scheme, comprising the steps of:

receiving a television signal containing video information, video synchronization information, and nonvideo digital data transmitted using a first modulation scheme;

adjusting the amplitude of said nonvideo digital data portions of said received television signal, independently of said video information and video synchronization information portions, to an acceptable level for communication of said nonvideo digital data as part of said television signal using a second modulation scheme; and modulating said received television signal with the amplitude adjusted nonvideo digital data using said second modulation scheme, for transmission over a communication channel.

2. A method in accordance with claim 1 wherein said adjusting step comprises the steps of:

detecting a timing reference in the received television signal; and adjusting the gain of said television signal in response to said timing reference to vary the amplitude of said nonvideo digital data portions thereof without affecting the amplitude of said video information and video synchronization information portions thereof.

3. Apparatus for converting a television signal formatted for transmission using a first modulation scheme to a format suitable for transmission using a different modulation scheme comprising:

means, coupled to receive a television signal to be reformatted, for detecting timing information indicative of the location of nonvideo digital data contained in the television signal; and means responsive to said timing information for reformatting said nonvideo digital data located in said television signal independently of video and video synchronization information contained in said television signal.

4. Apparatus in accordance with claim 3 wherein said reformatting means modify the amplitude of said nonvideo digital data.

5. Apparatus in accordance with claim 4 wherein said reformatting means comprise:

a variable gain element coupled to receive said television signal;

said element having a control input responsive to a timing signal derived from said timing information for changing the element gain during a portion of said television signal containing said nonvideo digital data.

6. Apparatus in accordance with claim 5 wherein one of said modulation schemes comprises frequency modulation and the other of said modulation schemes comprises amplitude modulation.

7. Apparatus in accordance with claim 6 wherein said nonvideo data is multilevel pulse amplitude modulated data.

8. Apparatus in accordance with claim 4 wherein said reformatting means comprise:

a first signal path for passing said television signal without a meaningful gain shift;

a second signal path for passing said television signal with a gain shift necessary to provide said modified amplitude;

switch means coupled to said first and second paths; and means responsive to said timing information for actuating said switch means to output the television signal from said first path during television information portions thereof and to output the television signal from said second path during nonvideo digital data portions thereof.

9. Apparatus in accordance with claim 8 wherein one of said modulation schemes comprises frequency modulation and the other of said modulation schemes comprises amplitude modulation.

10. Apparatus in accordance with claim 9 wherein said nonvideo digital data is multilevel pulse amplitude modulated data.

11. Apparatus in accordance with claim 4 wherein said nonvideo digital data is multilevel modulated data.

12. Television distribution apparatus comprising:

a satellite television receiving station for receiving and demodulating a television signal transmitted as a frequency modulated signal from a satellite, said television signal containing video information and nonvideo data;

means coupled to said receiving station for recovering timing information from the demodulated television signal;

means responsive to said timing information for adjusting the amplitude of said nonvideo data to a level suitable for transmission using amplitude modulation; and means for amplitude modulating the demodulated television signal with the amplitude adjusted nonvideo data for distribution to a plurality of subscriber locations.

13. Apparatus in accordance with claim 12 wherein said adjusting means comprise:

a variable gain element coupled to receive said demodulated television signal;

said element having a control input responsive to a timing signal derived from said timing information for changing the element gain during portions of said television signal containing said nonvideo data.

14. Apparatus in accordance with claim 13 wherein said nonvideo data is multilevel pulse amplitude modulated data.

15. Apparatus in accordance with claim 12 wherein said adjusting means comprise:

a first signal path for passing said demodulated television signal without a meaningful gain shift;

a second signal path for passing said demodulated television signal with a gain shift necessary to provide said suitable level;

switch means coupled to said first and second paths: and means responsive to said timing information for actuating said switch means to output the demodulated television signal from said first path during television information portions thereof and to output the demodulated television signal from said second path during nonvideo data portions thereof.

16. Apparatus in accordance with claim 15 wherein said nonvideo data is multilevel pulse amplitude modulated data.

17. Apparatus in accordance with claim 12 wherein said nonvideo data is multilevel modulated data.

* * * * *